UNITED STATES PATENT OFFICE.

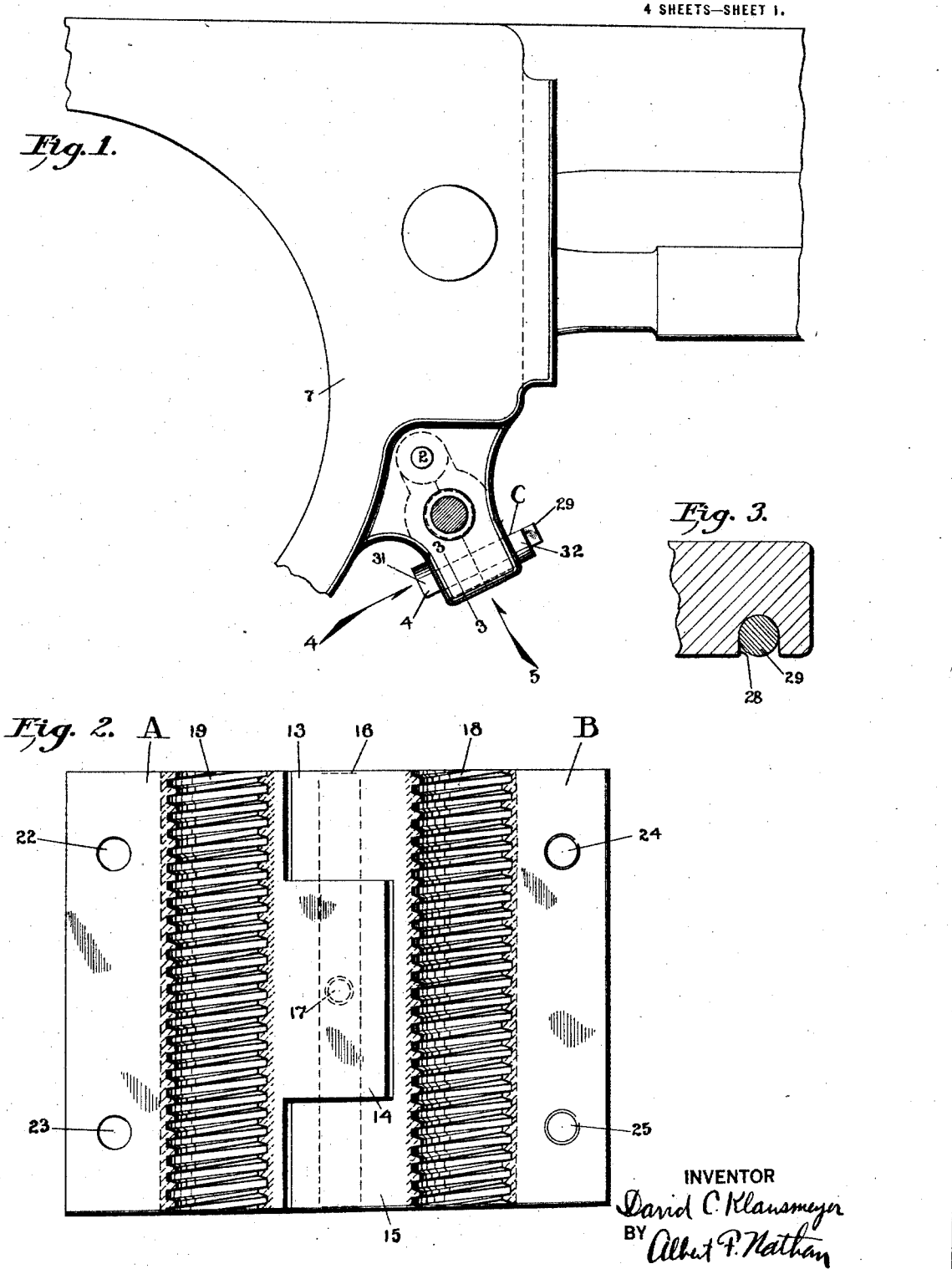

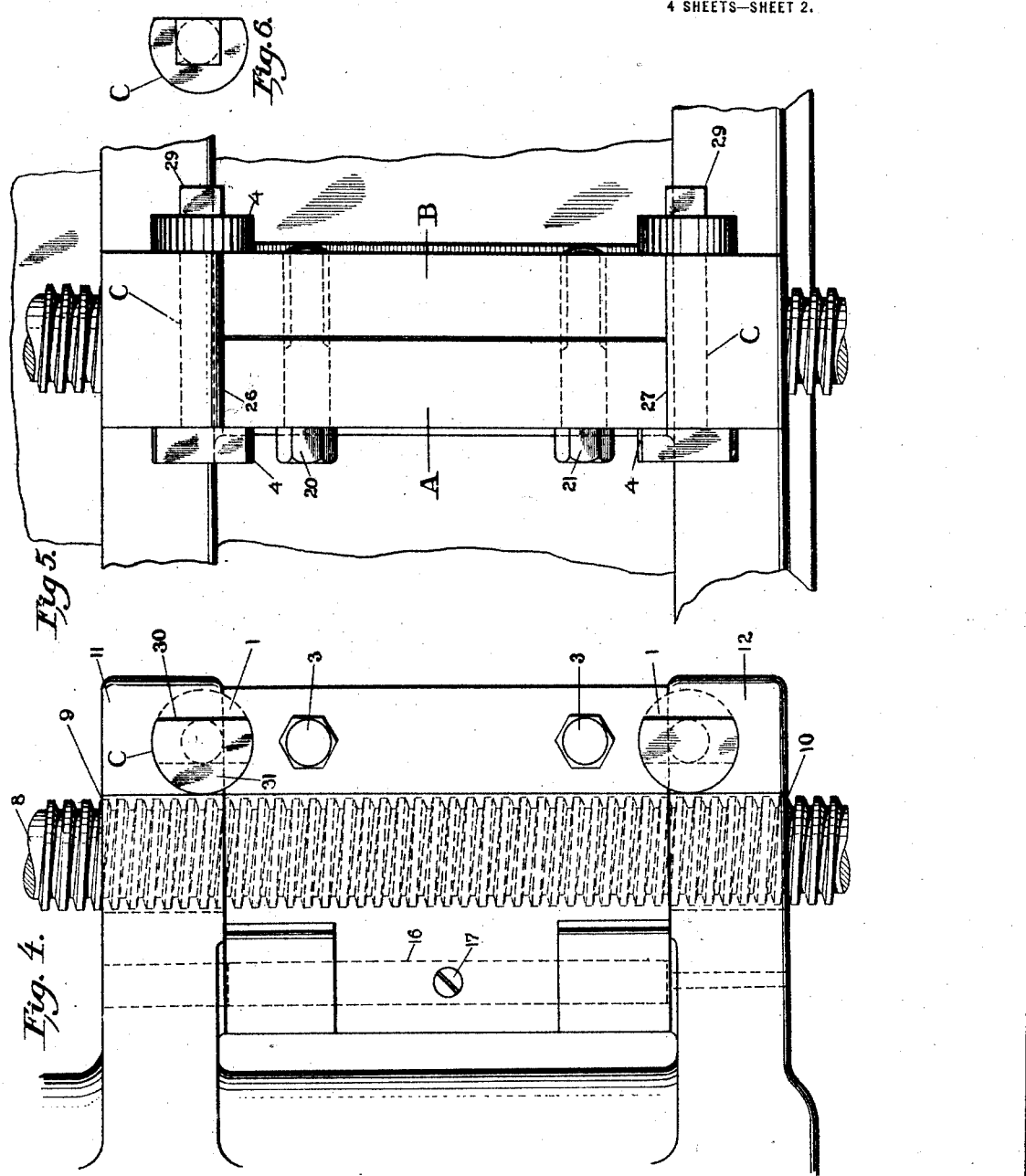

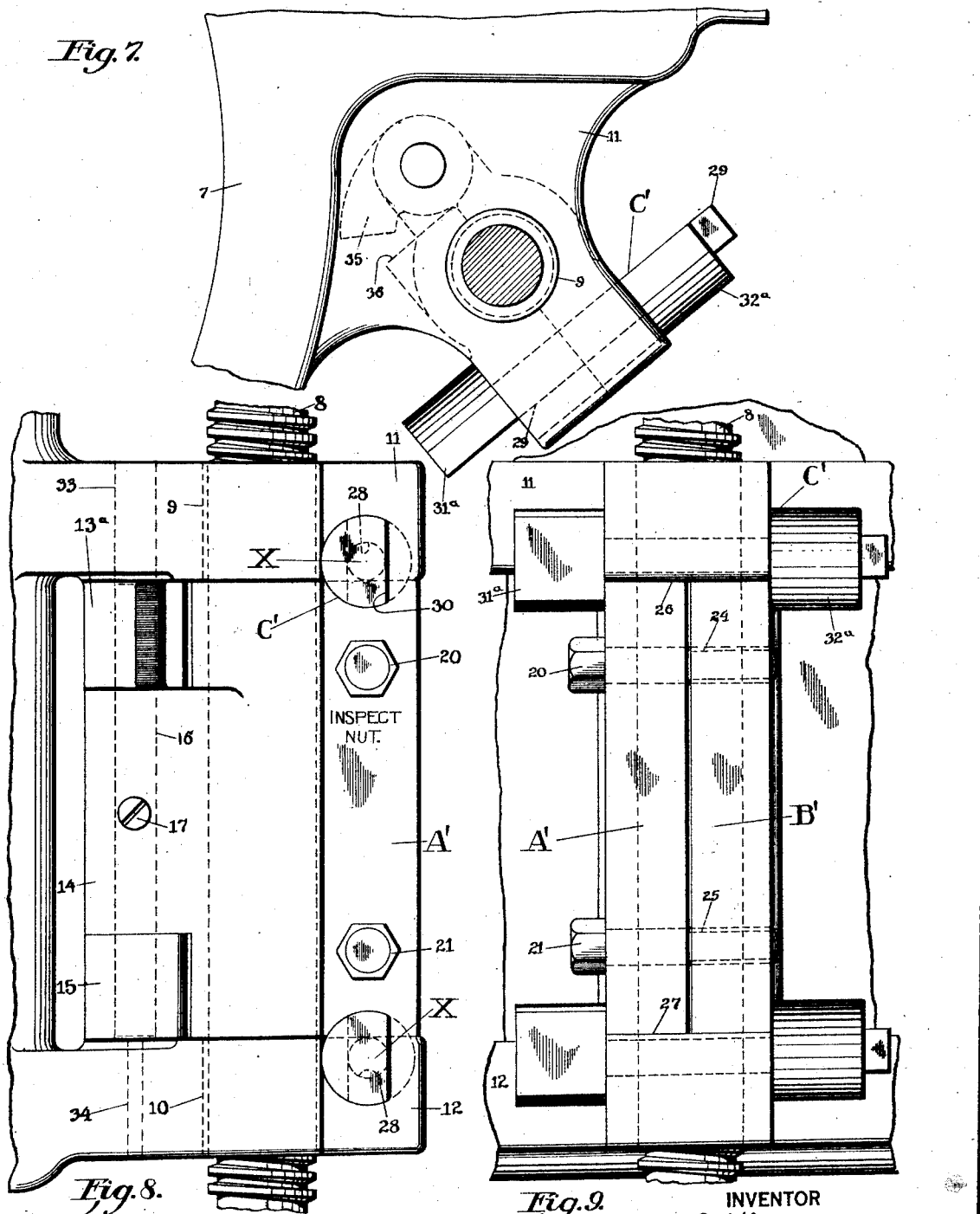

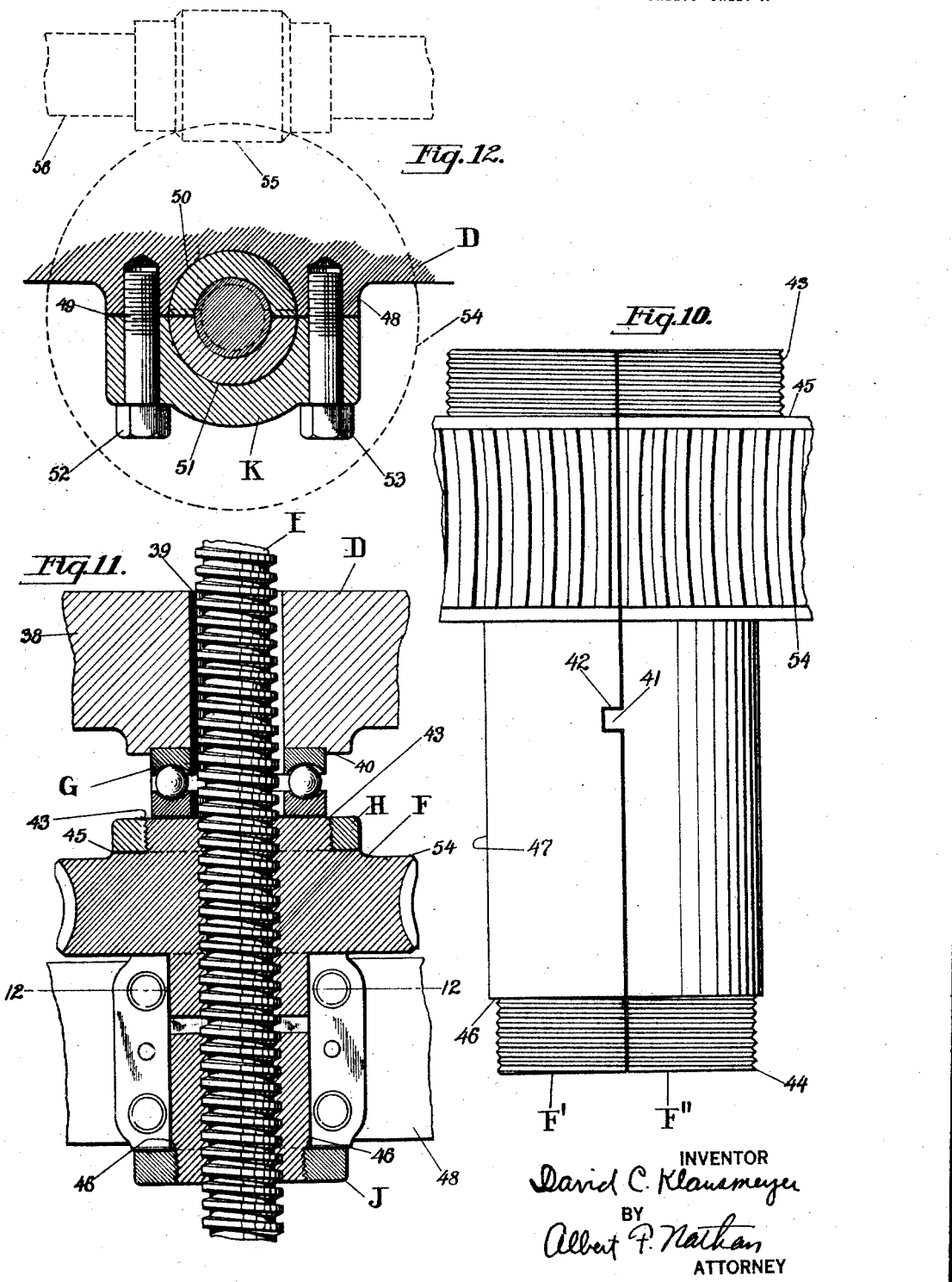

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

SECTIONAL INSPECTIVE NUT.

1,415,840.      Specification of Letters Patent.      Patented May 9, 1922.

Application filed July 8, 1921. Serial No. 483,231.

*To all whom it may concern:*

Be it known that I, DAVID C. KLAUSMEYER, a citizen of the United States, and residing at Cincinnati, in the county of Hamilton and State of Ohio, have invented a new and Improved Sectional Inspective Nut, of which the following specification is a full disclosure.

This invention relates to safety devices and it is directed more especially to apparatus wherein a relatively heavy and ponderous member is elevated through the agency of a nut and screw.

By reason of the fact that a nut is necessarily quite short in length while the screw is much longer, it follows that the wear is capable of being distributed over a much greater length of thread, and consequently is proportionately less destructive, in the case of a screw than in the case of a nut. Furthermore, since the threads of a nut are internal, the wear on them is not ordinarily capable of being readily seen and therefore the threads may easily become worn to the point of stripping without being brought to the attention of the user. Furthermore, the nature of the nut, and the necessities incidental to its proper mounting, has led to the conventional practice of locating the nut in a comparatively inaccessible region; it being usually imbedded in the part that it is arranged to elevate. In the case of machine-tools, the nut may either be rotatable or non-rotatable in accordance with the preferences of the builder and, in the case of drilling machines, the nut is usually arranged in a socket in the heavy ponderous radial arm which it is designed to elevate by cooperating with the lifting screw. The nut may, of course, be integral with the part which it serves to elevate but, ordinarily, such part is made of inexpensive material which generally does not provide sufficient strength for the threads. Consequently, it is better practice to manufacture the nut separately of higher grade materials and then appropriately attach it either to the part which is intended to be elevated, or to the relatively stationary part in case the screw is the element that translates and imparts its translation to the member to be elevated.

On account of the fact that the nut receives a preponderating proportion of the wear, and inasmuch as such wear is not immediately apparent and cannot be ascertained without disassembling the parts, there is considerable danger that its threads will be weakened by wear to the point of stripping under the weigth of the arm or other frame-element of the machine in which it is embodied. In that event, there would be nothing to prevent the arm from falling of its own weight; to the damage of the machine and to the injury of any person in its path.

This invention proposes an improvement in the construction of the nut whereby it may very easily, and without in any wise disturbing the assembled elements of the machine, be inspected for the purpose of determining the condition of its threads, and thereby enable the user to ascertain whether it is safe to continue the use of the nut or whether it should be replaced by a new one.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a fragmentary plan of the arm of a radial-drill equipped with an inspective nut in accordance with this invention. Fig. 2 is an isolated view of the detached inspective nut opened to show its interior construction. Fig. 3 is a section along the line 3—3 of Fig. 1 showing the mounting of the double ended unsymmetrical bolt that serves alternatively to hold either the one or the other of the nut-sections in place when the companion section is swung clear for purposes of inspection. Fig. 4 is a side elevation of the attachment looking in the direction of arrow 4 on Fig. 1. Fig. 5 is an end elevation looking in the direction of arrow 5 on Fig. 1. Fig. 6 is an end view of one end of the retaining bolt. Figs. 7 to 9 are similar to Figs. 4 to 6 but show means positively preventing both nut-sections from being simultaneously disengaged. Figs. 10 to 12 show the application of this invention to a rotatable nut; Fig. 10 being an elevation of the isolated nut, Fig. 11 being a vertical section of its arrangement in a machine, and Fig. 12 being a section through line 12—12 of Fig. 11.

This invention has been illustrated in connection with its preferred use; to wit, for elevating the arm of a radial drill. It will, however, be understood that it is applicable to other uses. In the drawings, 7 represents a fragmentary portion of the arm of a drilling-machine which, in the conventional manner, is guided by a vertical post or column along which it is adapted to be raised and lowered by the action of a nut and screw. In Figs. 1 to 9 of the drawings, a screw of the rotatable and non-translatable type has been selected for purposes of illustration and this screw 8 extends vertically through apertures 9 and 10 extending through projecting portions of 11 and 12 of the arm. These portions 11 and 12 have been shown in outstanding relation to the body-portion of the arm so as to locate the inspective nut where it will be most readily accessible to the user of the machine. To that end, the inspective nut is located in the corner where the radial part of the arm merges into the sleeve-like portion that encircles the post, as shown best by Fig. 1.

The inspective nut is preferably composed of two counterpart portions A and B which are provided with interfitting lugs 13, 14 and 15 hinged together by means of a pin which is appropriately held against displacement by a set screw 17. The aforesaid portions are located at one side of the central region of the nut-sections so that the latter may swing open quite clear of the lifting screw to expose the condition of their threads. These threads are indicated by 18 and 19; half being on the section B, and the other half being on the section A. This split nut is normally held closed very firmly by means of bolts 20 and 21 passing through holes 22 and 23 in the section A and having their threaded ends in engagement with the threaded recesses 24 and 25 in the companion section B. This forms a very solid nut when the parts are all bolted together and in effect constitutes a single element. The threads 18 and 19 are preferably cut in a facing of high-grade bearing metal with which the semi-circular sockets of the sections A and B are lined; such sections themselves being preferably made of iron or steel for the sake of strength and cheapness. When closed together and bolted, the aforesaid two-part nut is adapted to be snugly retained as a unit between the opposing faces 26 and 27 of the lugs 11 and 12, during the normal operation of the machine.

At intervals, however, it is desirable to make an inspection of the nut. If its two halves should each be simultaneously detached from the screw, it is apparent that there would be nothing to hold the arm against falling and this invention, therefore, makes special provision against any occurrence of this nature. To that end, the upper and lower wings 11 and 10 are each provided with a shallow transverse groove 28 in which rests the shaft 29 of a double-ended one-piece bolt C so constructed as to permit either one of the nut-sections alone to be swung clear of the screw, but not simultaneously with the companion section when these parts are normally assembled in position as shown by Figs. 1, 4 and 5.

When the user wishes to inspect the section A, he will apply a wrench to the squared boss 29 of the upper and lower bolts and turn them until the flat 30 rests horizontally and, in each case, clears the path of the section A. It will be observed that the head 31 on this end of the bolt occupies a position diametrical opposite to that of the corresponding head 32 located on the other end of the bolt. Consequently, when the one nut-section A is releasable, the other nut-section B is retained against movement by the opposite head 32 above mentioned. The user can thus, by removing bolts 20 and 21 and by appropriately turning the aforesaid bolts 29 into their proper positions, swing out either one or the other of the nut-sections. After the one section has been examined, the user will restore it to its position so that it will engage the screw and serve to hold the arm against falling while the other section is being likewise inspected. It will be noted that, when the user turns the bolts 29 to free the last mentioned section, he automatically engages the other section by the same operation.

Should it be seen that the threads are unduly worn, the replacement of the nut is a very simple matter. The arm need only be independently supported temporarily; whereupon the unit may be dismantled and entirely replaced in a few moments without even demounting the lifting screw, thereby restoring the machine to its original reliable condition. The screw 17 will be loosened to release the hinge-pin 16 which may thereupon be driven upwardly through the hole 33 in the wing 11 by means of a smaller rod inserted in the hole 34 which is preferably made of less diameter than the pin 16 so that said pin may not drop loose should the screw 17 become loose.

A great advantage of this construction follows from the fact that the user has every opportunity to obtain timely warning of the rate of wear so that steps may be taken towards a procurement of a new unit while the machine is continued in use, thereby avoiding any appreciable period of non-use of the machine occasioned by delays in obtaining a new unit. It permits the user to inspect the entire thread-area and thereby detect any local defects, such as spongy metal, which may be the cause of unduly rapid wear.

Unlike the embodiment described in the foregoing, the modification represented by Figs. 7, 8 and 9 does not admit of being "taken down" without demounting the lifting-screw. This adaptation, while occasioning some inconvenience, has the advantage of being completely "fool-proof" inasmuch as, by no manner of manipulation, can both sections of the nut be simultaneously brought out of engagement with the screw so as to leave the heavy arm without support and permit it to fall. For a careful attendant, the first form is preferable but, for less dependable operators, the second arrangement is more desirable; the inconvenience of the only-occasional nut-replacements being discounted by the possibility (although remote) of causing a drop through a stupid and unthinking manipulation of the retaining bolts after one of the nut sections has already been withdrawn, and without following the normal step of restoring it before attempting to release its companion.

Referring to Figs. 7, 8 and 9, it will be seen that means is provided to limit the extent to which the sections A′ and B′ may be angularly separated; said means being independent of any parts not belonging to the sectional nut considered as an isolated unit. Thus, at 35 is a lug formed on the section B′ and at 36 is a lug formed on the section A′; these lugs being a convenient means for providing two contact surfaces adapted to abut and restrict the extent of relative movement between these sections. The amount of play thus provided is made sufficient to expose to view the threads of one section when the other section is nested with the screw, and this clearance is also so proportioned with respect to the double-ended safety bolt C′ that the displaced nut-section will obstruct any rotation of said bolt until it has been restored to its normal position. This result is attained by making the heads 31ª and 32ª of the bolt somewhat longer than in the first modification of Figs. 1 to 6 so that when either section has been displaced to its maximum extent, it will still be in the path of the flat 30 and thus interfere with any movement of the bolt.

Hence, by no manner of manipulation, can the user of this improved arrangement disengage the other section when its companion is clear of the screw and capable of sustaining the arm against falling during the inspection of the nut-threads. This arrangement, is accordingly absolutely proof against any mishap resulting from improperly tampering with the parts. Should it be desired, however, to make this arrangement demountable, while at the same time retaining its property of positively preventing more than one section at a time to be inspected, the wings on the arm may be provided with holes similar to those denoted by 33 and 34 on Fig. 8.

The third modification depicted by Figs. 10 to 12 may be resorted to whenever a rotatable nut is employed. It is, for instance, quite usual to effect the elevation of the arm of a radial drill by means of a nut journalled in and bodily movable with said arm; said nut being rotated by means of a suitable transmission leading to the prime-mover. It is quite difficult to get access to the nut in such constructions and the replacement of the nut involves a demounting of the lifting-screw and is, in other respects, a very vexatious undertaking. Furthermore, it is quite impossible in such constructions to inspect the threads of the nut inasmuch as rotatable nuts are invariably made of one piece.

The previously explained characteristics of this invention admit of being very neatly and effectively utilized for imparting the safety features to rotatable nuts and, as an example of such utilizations, reference is made to Sheet 4 of the drawings. In this modification, D represents a portion of the arm of a radial drill. This arm is preferably so fashioned as to provide a portion 38 which is apertured, as indicated by 39, to provide for the passage of a non-rotatable lifting-screw E. The portion 38 integrally circumscribes the arm and provides an annular seat 40 adapted to rest upon a nut which, by reason of its threads, is supported by the screw. The nut is indicated by F and preferably a ball thrust-bearing G is interposed between the seat 40 and the nut so as to reduce the friction of the thrust occasioned by the weight of the arm D. In accordance with this invention, the nut F is sectional in form; being so constituted that one of the sections may be independently withdrawn to permit of inspection without disturbing the thread engagement between the screw and the remaining portion of the nut. Should it not be desired to utilize also the capacity of demountability, the removable section may be relatively small and in the nature, so to speak, of a sample of the nut but, inasmuch as the ability to demount the entire nut is a matter of no little consequence, it is desirable to have all of the sections of the nut successively demountable. In the construction illustrated, provision is made for enabling the user very readily to remove one section and then to replace it and then remove the other section, or to remove the sections successively, in which latter case the arm will be independently supported by a jack. As shown by Fig. 10, the nut consists of two sections F′ and F″. These sections are divided by a diametrical plane so that each may be freely removed from the screw, and these sections are held accurately against longitudinal displacement by means of a radial tongue 41 interfitting with a counterpart slot 42. In order to hold these sections against spreading, they are threaded at their respective ends, as indicated by 43 and 44 and suitable collars H and J are screwed on to these threaded ends and brought tightly against shoulders 45 and 46 provided by the sectional nut. The sections provide a smooth cylindrical portion 47 in the nature of a journal and this journal is normally arranged in a two-part bearing located on the underlying portion of the arm and admits of free access. To that end, such portion of the arm provides a boss 48 which terminates in a flat plane 49 coincident with the axis of the screw; said boss providing a semi-circular seat 50 adapted to receive one-half of the journal-like portion 47 of the nut. A cap K likewise provides a semi-circular seat 51 which receives the other half of the journal. This cap is, by means of the bolts 52 and 53 normally held in place as shown by Fig. 12 but admits of being very easily detached to expose one-half of the journal 47 of the nut. The nut is driven by a worm-wheel 54 normally meshing with a worm 55 mounted on a shaft 56 suitably journalled in or on the arm.

Should it be desired to inspect one of the sections of the nut, the collar H will be screwed off of the end 43; it being noted that the ball-bearing G is smaller in diameter than the threaded end 43 of the nut so as to permit the collar to be moved upwardly to encircle the ball-bearing and entirely clear the nut. Likewise, the collar J is unscrewed from the other end of the nut and the cap K is unbolted and removed. Now, by rotating the shaft 56 until the split in the nut coincides with the plane 49, one of the sections of the nut will be entirely free and may be removed; the other section being, however, held in place by reason of intervening between the seat 50 and the screw so that any inadvertent fall of the arm will be guarded against. The removed section may now easily be replaced and, by turning the shaft 56, the sectional nut will be rotated as a unit until the other section is brought into its releasable position, whereupon it may likewise be removed and inspected. Should it be desired to entirely replace the nut, the arm will first be jacked up and the sections of the old nut will be removed in succession and the sections of the new nut will be inserted in succession and the collars and the cap will be replaced and the organization will then be ready for further use.

It will be seen that this construction is simple in arrangement and effective for the purposes indicated.

Without further analysis, the foregoing will so fully reveal the gist of this invention that others can, by applying current knowledge, readily adapt it for various utilizations by retaining one or more of the essential characteristics of either the generic or specific aspects of this invention, and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:—

1. A machine-tool combining an upwardly movable frame-element; a lifting-screw therefor; a nut operating in conjunction with said screw, said nut being constructed of two separable sections; and means for preventing the one section from being withdrawn from said screw without first locking the other section against withdrawal.

2. A safety elevating-mechanism combining a member to be lifted; a two-part nut axially split and mounted in said member so as to be restrained against axial movement relative thereto; a screw threaded through the bore of said two-part nut; and means for permitting either of the sections of said nut to be swung clear of said screw, said means being adapted to lock both of said sections in place and to release only one of said sections at a time.

3. A radial drill comprising, in combination, an arm adapted to be elevated; a nut and screw arranging to effect an elevation of said arm, one of said elements being mounted to sustain the thrust and the other being arranged to engage said arm, said nut being constructed in sections and adapted to be entirely demounted without removing said screw, whereby said nut may expeditiously be replaced by a new nut and a locking-bolt adapted to prevent a separation of said sections and also adapted to prevent said sectional-nut from moving relatively to said arm.

4. A machine-tool combining a relatively stationary frame-element; an upwardly movable frame-element; and a nut and screw intervening between said elements to effect an elevation of the movable element, said nut being constructed in two sections each being independently removable; and means for normally retaining said sections together, said means being adapted to release one of said sections while retaining the other against being demounted from said frame-element.

5. A radial drill combining an arm adapted to be elevated, said arm being provided with a laterally open socket; a lifting-screw extending vertically through said socket; a nut normally located in said socket against endwise movement, said nut comprising sections in threaded engagement with said screw, one of said sections being adapted to be bodily removed from such socket for purposes of replacement without disassembling the other section from said screw; and means for normally retaining said sections in unitary relation.

6. A radial drill combining an arm having a socket; a screw extending vertically through said socket; and a sectional nut mounted in said socket with its sections normally maintained in threaded engagement with said screw, the parts being constructed and arranged so that but one of said sections may be removed and replaced without disassembling either the arm, the remaining section or the screw.

7. A radial drill combining an arm adapted to be elevated and having a socket; a lifting-screw extending vertically through said socket; a sectional nut contained in such socket; and a bolt having two segmental heads for normally locking the sections of said nut against bodily removal, said bolt being adapted to be operated to afford a temporary disengagement of one of said sections from such screw, whereby the condition of its threads may be ascertained.

8. An elevating mechanism combining a frame-element; a lifting-screw; a nut demountably journaled in said frame-element, said nut being composed of sections; and means comprising a segmental head for normally holding said sections against separation and adapted to permit one of them to be demounted from said screw without disturbing either the other section or the mounting of said screw.

In witness whereof, I hereunto subscribe my name, as attested by the two subscribing witnesses.

DAVID C. KLAUSMEYER.

Witnesses:
   C. C. SLETE,
   ANNA HUSSIAN.